(12) United States Patent
Atri et al.

(10) Patent No.: US 12,032,968 B2
(45) Date of Patent: Jul. 9, 2024

(54) METHOD AND SYSTEM FOR CREATING SERVER CLUSTER ON EDGE LOCATION

(71) Applicant: Rakuten Mobile, Inc., Tokyo (JP)

(72) Inventors: Rahul Atri, Singapore (SG); Mohit Luthra, Singapore (SG); Bharath Rathinam, Tokyo (JP); Puneet Devadiga, Tokyo (JP); Ashish Madan, Singapore (SG); Amber Jain, Madhya Pradesh (IN); Apoorva Soni, Madhya Pradesh (IN); Shubham Rathore, Madhya Pradesh (IN); Rajat Sethi, Madhya Pradesh (IN); Pramod Parmar, Madhya Pradesh (IN); Seihin Shu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 238 days.

(21) Appl. No.: 17/487,773

(22) Filed: Sep. 28, 2021

(65) Prior Publication Data
US 2023/0097332 A1 Mar. 30, 2023

(51) Int. Cl.
G06F 9/4401 (2018.01)
H04L 9/40 (2022.01)
H04L 41/084 (2022.01)

(52) U.S. Cl.
CPC ........ *G06F 9/4403* (2013.01); *H04L 41/0843* (2013.01); *H04L 63/083* (2013.01)

(58) Field of Classification Search
CPC ............... G06F 9/4403; G06F 9/44505; H04L 41/0843; H04L 63/083; H04L 41/0886
See application file for complete search history.

(56) References Cited

U.S. PATENT DOCUMENTS

| | | | |
|---|---|---|---|
| 8,583,769 B1 * | 11/2013 | Peters | H04L 63/104 709/221 |
| 9,426,030 B1 * | 8/2016 | Anerousis | H04L 41/08 |
| 11,616,691 B1 * | 3/2023 | Atri | H04L 41/0843 709/221 |
| 2011/0225647 A1 * | 9/2011 | Dilley | H04L 63/16 726/14 |
| 2014/0108665 A1 * | 4/2014 | Arora | H04L 67/563 709/227 |
| 2019/0090305 A1 * | 3/2019 | Hunter | H04W 84/04 |
| 2020/0356363 A1 * | 11/2020 | Dewitt | G06F 8/75 |

(Continued)

Primary Examiner — Faisal M Zaman
(74) Attorney, Agent, or Firm — HAUPTMAN HAM, LLP

(57) ABSTRACT

A method includes automatically configuring a cluster using pre-defined templates of one or more servers positioned in an edge location. The method also includes creating a plurality of configuration profile templates. The method also includes obtaining one or more parameter values. The method also includes defining a plurality of parameters in each of the plurality of configuration profile templates based upon the one or more parameter values obtained. The method also includes creating a master template based on the plurality of configuration profile templates. The method also includes storing the master template in a repository. The method also includes automatically creating a planned inventory file based on the master template. The method also includes configuring the cluster of the one or more servers based on the planned inventory.

20 Claims, 14 Drawing Sheets

(56) References Cited

U.S. PATENT DOCUMENTS

| | | | |
|---|---|---|---|
| 2021/0117307 A1* | 4/2021 | MacNamara | G06F 11/302 |
| 2022/0066847 A1* | 3/2022 | Liu | G06F 9/541 |
| 2022/0300256 A1* | 9/2022 | Baker | G06F 8/10 |

* cited by examiner

METHOD AND SYSTEM FOR CREATING SERVER CLUSTER ON EDGE LOCATION

BACKGROUND

A server cluster is a set of servers that work together to be viewed as a single system. Unlike grid servers, server clusters have each node set to perform the same task, controlled and scheduled by software. The components of a cluster are usually connected to each other through networks, with each node running of an operating system. Clusters are usually deployed to improve performance and availability over that of a single computer, while typically being much more cost-effective than single computers of comparable speed or availability.

Edge computing is a distributed computing paradigm that brings computation and data storage closer to the location where edge computing is needed to improve response times and save bandwidth. Edge computing is a topology rather than a technology. The origins of edge computing lie in content delivery networks that served web and video content from edge servers that were deployed close to users of the web and video content. Edge networks evolved to host applications and application components at the edge servers, resulting in commercial edge computing services that hosted applications such as dealer locators, shopping carts, real-time data aggregators, and ad-insertion engines.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIG. 2B is a pictorial representation of a cluster profile input form, in accordance with embodiments of the present invention.

FIG. 2C is a pictorial representation of an application profile input form, in accordance with embodiments of the present invention.

DETAILED DESCRIPTION

Figure 1A:
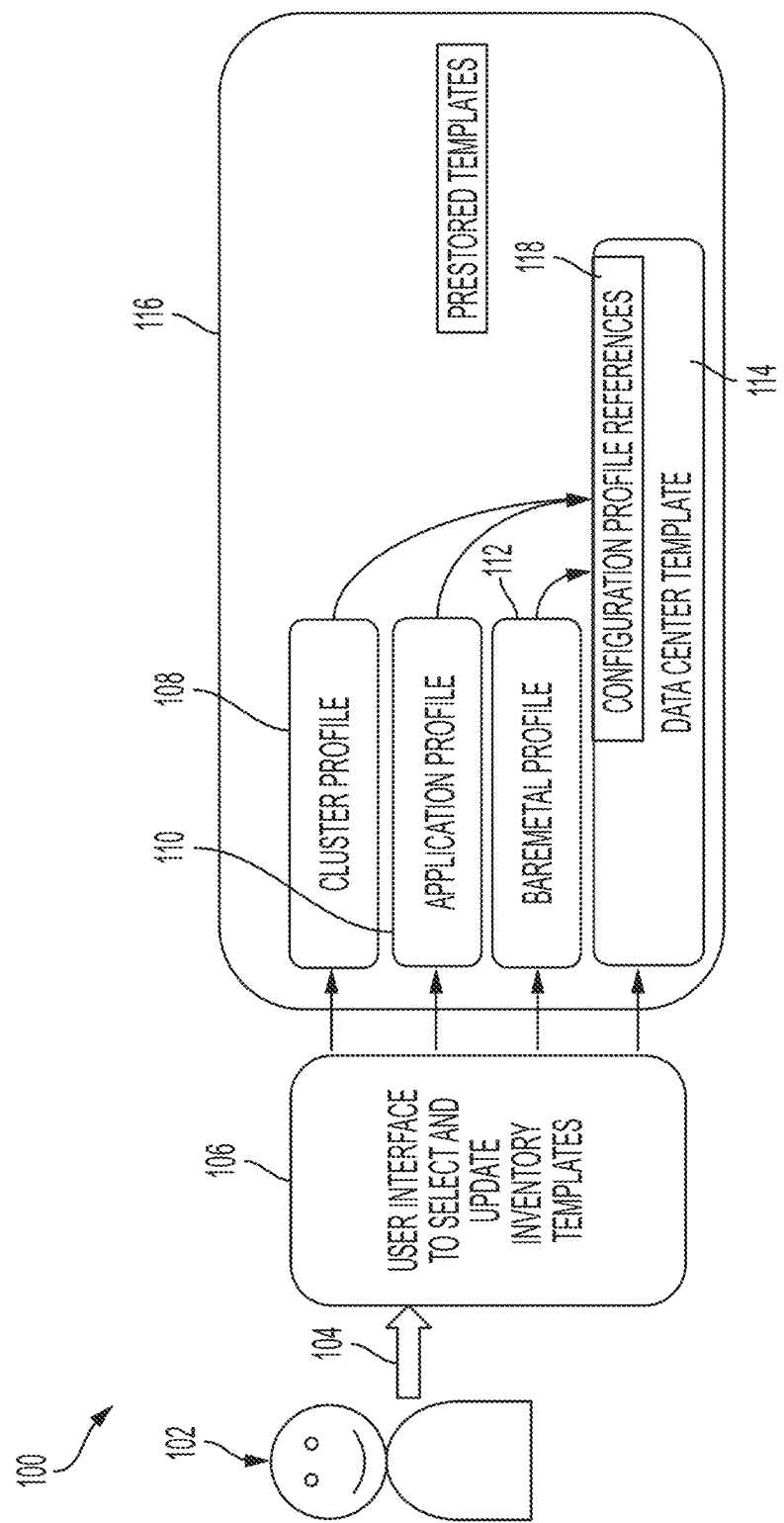
FIG. 1A is a diagram representation of a server-cluster creation system, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some embodiments, cluster creation is a process of installation of basic input output system (BIOS), firmware, operating system (OS) and Kubernetes (K8s) on a group or cluster of servers. BareMetal as-a-service (BMaaS) is a tool, which is configured to be used for remote cluster installation. BMaaS is configured to use a set of input JavaScript object notation (json) file(s) which includes the planned inventory of that cluster. The json file contains IP addresses to be assigned to each node, hostnames, credentials, URL path of installation packages, network interfaces, version-controlled selection of software packages, runtime configuration parameters for clusters and other suitable parameters and information are within the contemplated scope of the disclosure. Once BMaaS receives the planned inventory file for the cluster, BMaaS implements the firmware, OS and K8s installation on the target cluster on the edge location.

In some embodiments, a user interacts with a user interface where the user is able to input parameters to create a cluster planned inventory file through inputting desired configuration parameters into one or more parameter forms. The user will input one or more of four types of data: (1) BareMetal profile: parameter related to individual BareMetal server in the cluster; (2) Cluster profile: parameters related to platform layer—K8s; (3) Application profile: parameters related to workload; and (4) Data Center Template (e.g., the input parameters to the Data Center Template, which are configured to specify to a server which node is the worker/master): references of each profile and selection of Master and Worker nodes; other suitable types of data are within the contemplated scope of the disclosure In some embodiments, the user inputs templates with the parameters in the four forms. The user creates a cluster by logging into the data center home page, click on create new cluster (e.g., a graphical user interface) and selects the desired data center template. Once the user selects the data center template, an inventory module takes care of creating that cluster planned inventory file by parsing the template, identifying all the required parameters, making the API calls to IPAM for generating the IP address, making the API calls to Naming Module to generate hostnames for each node, and this way, the completed planned inventory file is generated automatically. A user can repeat the process of creating any number of clusters using the same templates.

In some embodiments, custom built cluster templates are created for multiple servers. A number of configuration templates are available and selectable for a user to choose and input parameters in configuration templates. An inventory file is created using the user inputs to the configuration templates.

In some embodiments, a cluster automation system allows a user to create templates and use that template whenever another user wants to create a new cluster. The created templates eliminate software builds, environment specific configurations and user selection values. The creation of templates automates the source code file (e.g., inventory file) by using templates and user input to the parameters included in the templates.

In some embodiments, an inventory file takes a few seconds to generate. In some embodiments, the inventory file is generated automatically with no human errors. IP addresses are generated from IP address management (IPAM) automatically. IPAM generates a unique IP address and thus no IP conflicts. The process of creating templates is immutable. Thus, a user selects an already created template for creating new template.

In some embodiments, faster creation of clusters is possible with quicker deployment of servers. The template creation reduces cost as the deployment of the clusters is automated.

In some other approaches, to input cluster parameters the inventory file source code is manually changed. When a user wants to make a change; even to a single parameter, the source code is manually changed, and a complete source code release life cycle is performed in order to bring about the change. In some other approaches, Excel based inventory maintenance tools are available, but are difficult to manage and prone to errors. In some other systems, writing a new inventory file manually takes several hours for any reconfiguration. A repetitive process which has to be followed every time a change in configuration occurs. Manually writing a new cluster planned inventory is prone to human errors in the coding of the planned inventory file. Other such systems have an inventory file created again from scratch for new clusters. Increasing the chances of conflicts such as internet protocol (IP) address conflict.

FIG. 1A is a diagram representation of a server-cluster system 100, in accordance with some embodiments.

Server-cluster system (SCS) 100 includes user interface (U/I) 102. SCS 100 includes processing circuitry 902 (FIG. 11) and also includes a memory 904 (FIG. 11) connected to processing circuitry 902 (FIG. 11), where the memory is configured to store executable instructions 906 (FIG. 11). Executable instructions 906 when executed by processing circuitry 902, facilitate performance of operations, including receiving, from a user 102, a new input request 104, at user interface 106, including new parameters for a cluster. User interface 106 allows user 102 to input parameters related to configuration profile references. Based upon the user's selection of a template and inputted parameter changes (such as, cluster profile 108, application profile 110, and BareMetal profile 112) a new template is created at data center template engine 114. Data center template engine 114 receives the user's template selection and inputted parameter changes and creates a new template to be stored in pre-stored templates database 116. Further, user 102 is able to select a desired template from the pre-stored templates database from user interface 106. Data center template engine 114 then modifies the identified and selected template, based on the user's inputted parameters received at configuration profile references 118 through user interface 106 and profiles 108, 110 and 112. Data center template 114, then creates a new master template based upon the user's changes to be stored in pre-stored templates 104. Further, data center template engine 114 creates a new inventory file that is usable by cloud services, such as BareMetal as-a-service (BMaaS) toll, to reconfigure the existing cluster.

User 102 interacts with user interface 106 and inputs a new template request. When a new template has been selected, user 102 is able to input new parameters. User interface 106 is where interactions between user 102 and pre-stored template database 116 occur. User interface 106 allows effective operation and control of SCS 100 by user 102. In some embodiments, user interfaces are composed of one or more layers, including a human-machine interface (HMI) that interfaces machines with physical input hardware such as keyboards, mice, or game pads, and output hardware such as computer monitors, speakers, printers and other suitable user interfaces are within the contemplated scope of the disclosure. Additional user interface layers may interact with one or more human senses, including: tactile user interface (touch), visual user interface (sight), auditory user interface (sound), olfactory user interface (smell), equilibrial user interface (balance), gustatory user interface (taste) and other suitable user interface layers are within the contemplated scope of the disclosure.

User interface 106 interacts with pre-stored template database 116. User interface 106 presents user 102 with several graphical user interfaces (e.g., display pages shown in FIGS. 2A-2D) where user 102 is able to select a configuration template, input or change parameters for each configuration profile reference including: cluster profile 108, application profile 110, and Baremetal profile 112. Further, user 102 identifies templates corresponding to the cluster that user 102 desires to create. Based on the user's selected template and inputted parameters data center template engine 114 creates a new template for storage in pre-stored template database 116 and an inventory file is automatically created for the creation process.

In some embodiments, predefined and pre-created templates are based off of the existing templates created for the first use of the cluster. Once another template is created in the process, this template is stored for possible future use. Making selection of templates efficient.

Figure 1B:
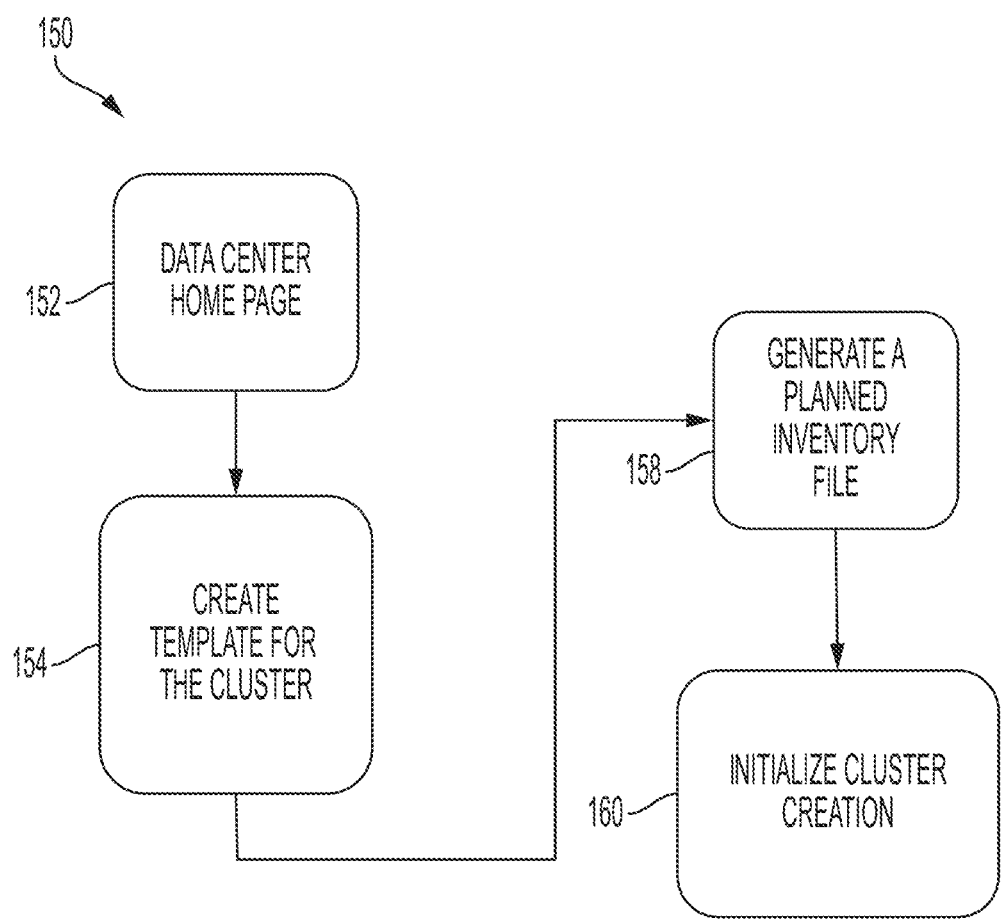
FIG. 1B is a flow diagram representation of a method of reconfiguring a server-cluster, in accordance with some embodiments.

FIG. 1B is a flow diagram representation of a method 150 of creating a server-cluster, in accordance with some embodiments.

For purposes of the disclosure operations as discussed need not be performed in the order as discussed in this disclosure. Some operations are not listed for the sake of brevity. Unless specifically stated, the operations discussed in FIG. 1B need not be performed in the sequences discussed.

In method 150, at operation 152, user 102 provides an input request. At user interface 106 user 102 begins a cluster template process. Form here operation 152 moves to operation 154.

In method 150, at operation 154, user interface 106 allows user 102 to select a new template. In a non-limiting example, user 102 may want to select a configuration template similar to one user 102 is currently working with. From here operation 154 moves to operation 158.

In method 150, at operation 158 data center template engine 114 generates a new inventory file from the created new master template from operation 156. In a non-limiting example, operation 158 creates a new planned inventory file based on the new master template. For example, the inventory file source code is automatically created for the new inventory file. From here operation 158 moves to operation 160.

In method 150 at operation 160 BMaaS parses the inventory file. Further, BMaaS starts a cluster creation workflow on a target cluster where the newly created template is deployed.

Figure 1C:
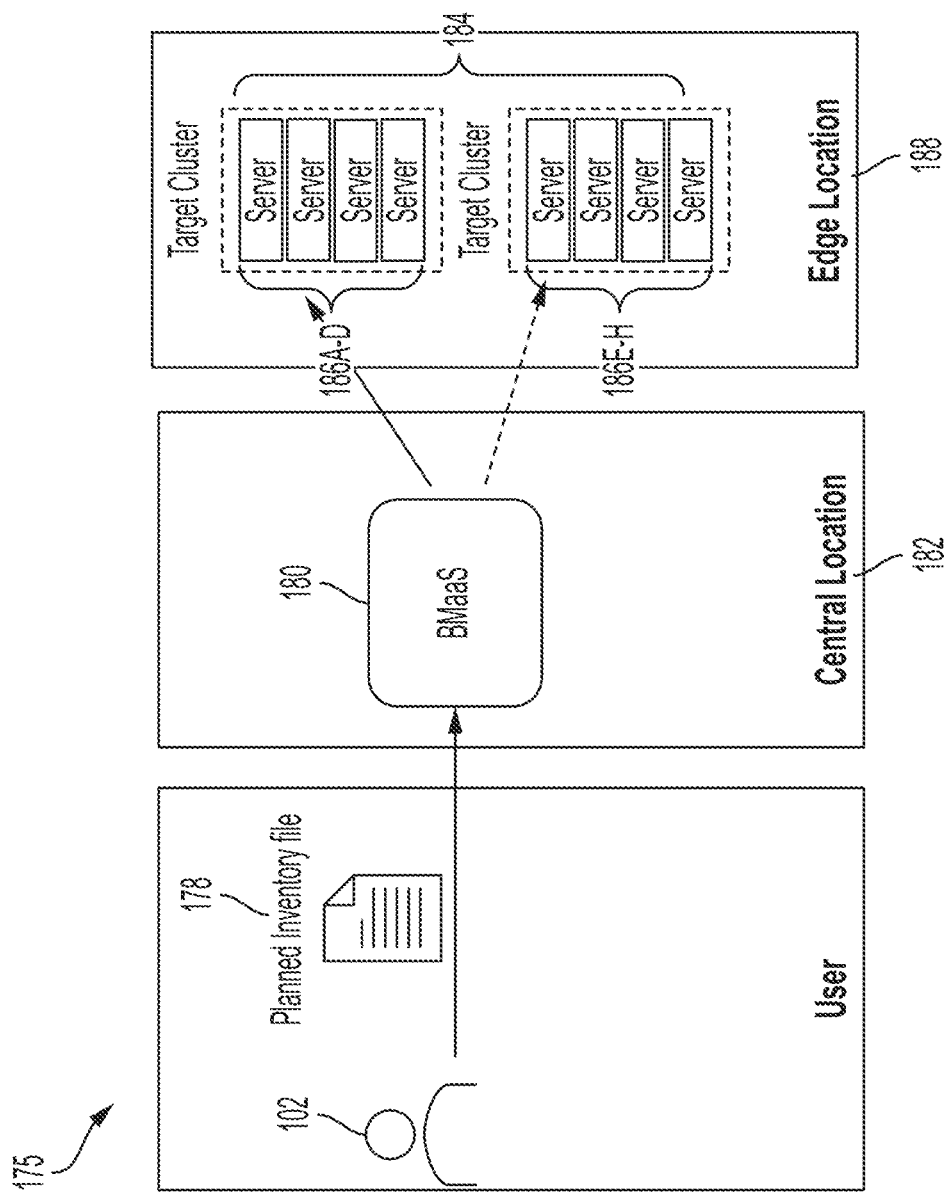
FIG. 1C is a diagram representation of a cluster automation system, in accordance with some embodiments.

FIG. 1C is a diagram representation of a cluster automation system 175, in accordance with some embodiments.

User 102 inputs cluster parameters (e.g., Table 1; FIG. 2B) like version, build uniform resource locator (url), virtual router identifier (vrid), and other suitable parameters are within the contemplated scope of the disclosure.

Figure 2A:
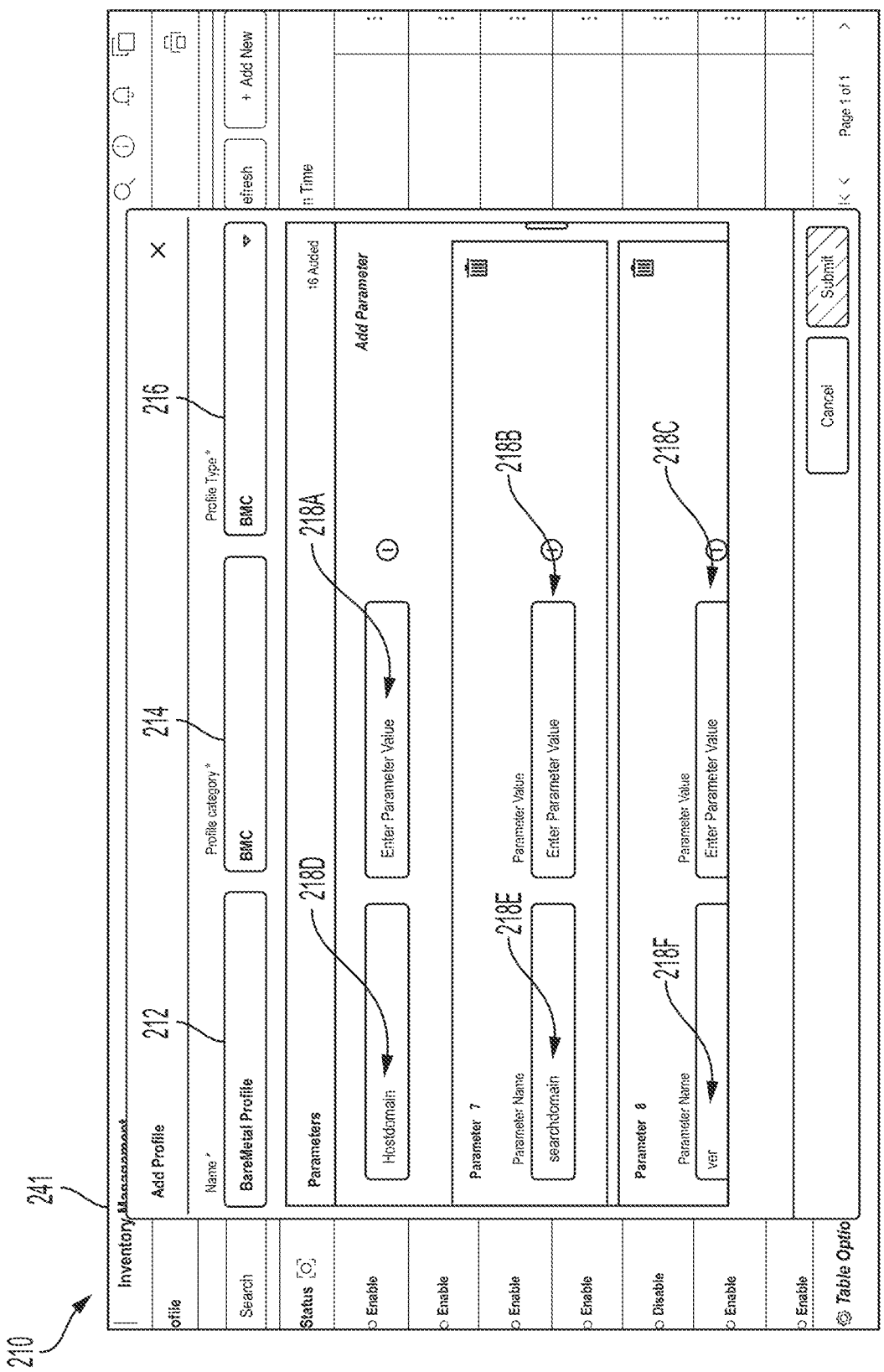
FIG. 2A is a pictorial representation of a BareMetal profile input form, in accordance with embodiments of the present invention.
Figure 2B:
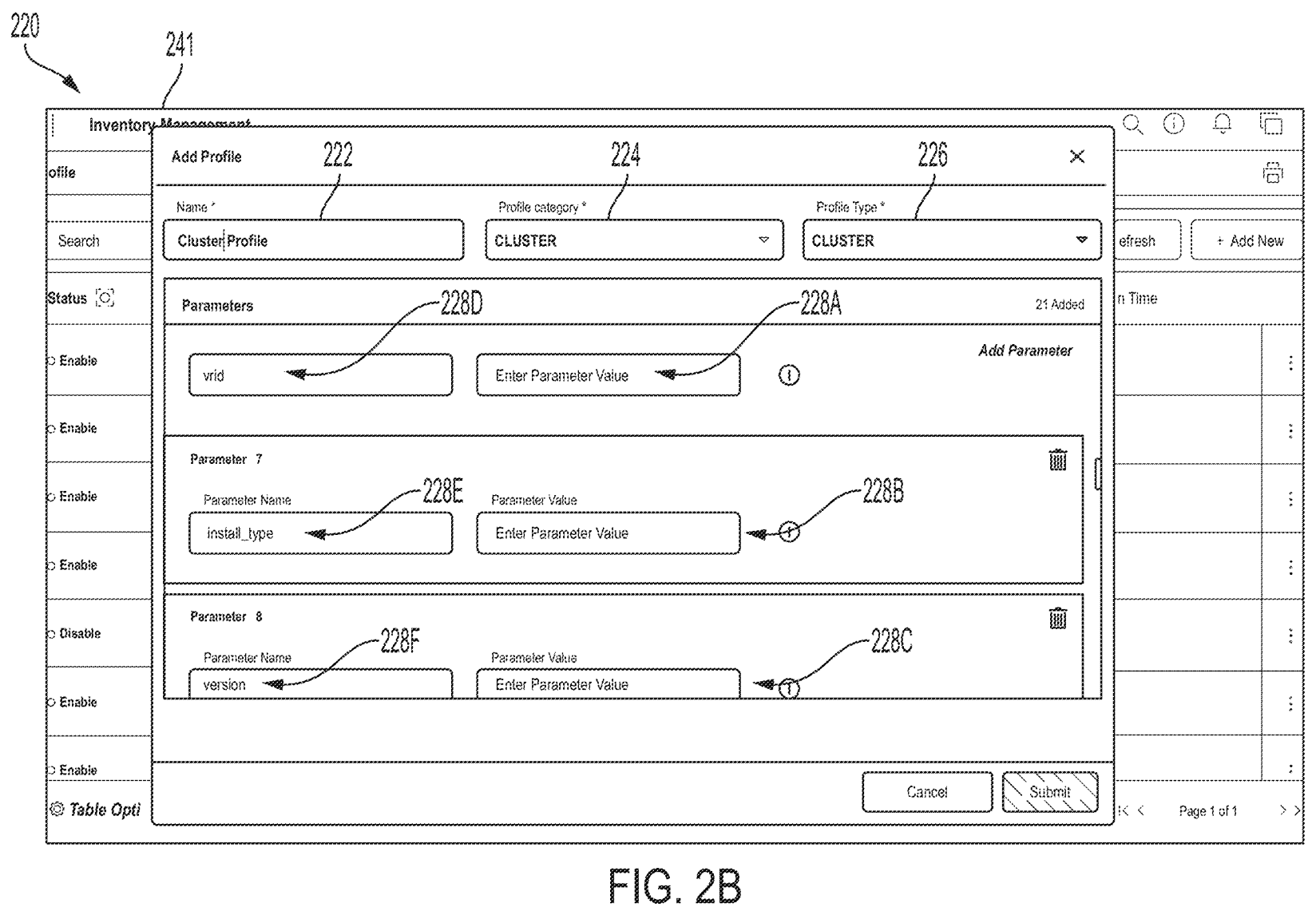

User 102 inputs the BareMetal details (e.g., Table 1; FIG. 2A) like Static Ips, hostnames, domains, users and other suitable parameters are within the contemplated scope of the disclosure.

Figure 2C:
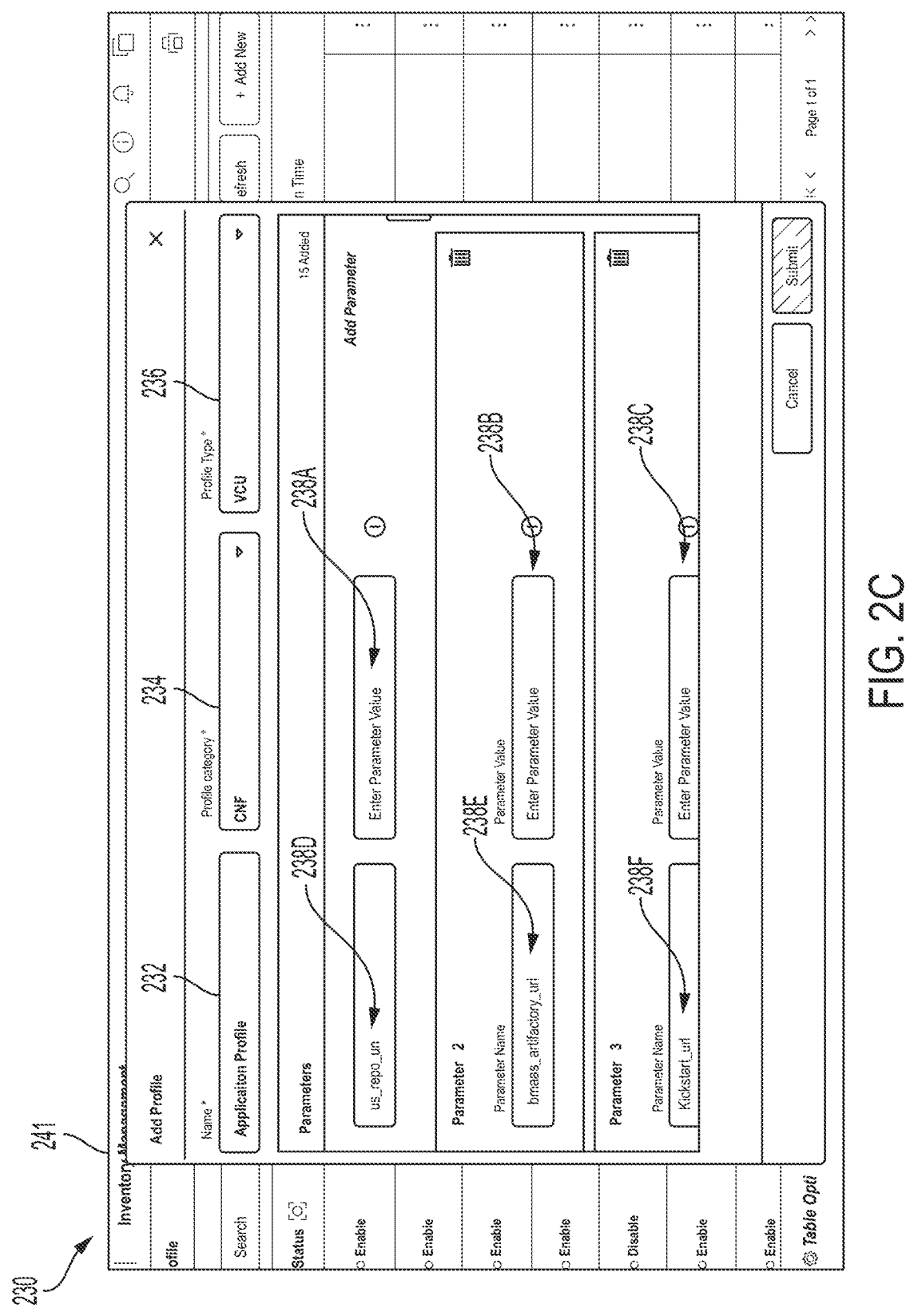

User 102 further inputs the application related parameters (e.g., Table 1; FIG. 2C) like flavor, kickstarter url, operating system (OS) url, config version and other suitable parameters are within the contemplated scope of the disclosure.

User 102 further registers inventory file 178 with BMaaS 180 that is located at a central location 182. BMaaS 180 parses inventory file 178 to cluster 184, at edge location 188 that includes servers 186A-186H. BMaaS 180 starts cluster creation workflow on target cluster 184.

User 102 prepares cluster inventory file 178. For example, user 102 performs the operations of method 150 to arrive at a cluster inventory file 178. User 102 marks the master (e.g., which is a specific computer handling the scheduling and management of the worker nodes) and worker nodes (e.g., general purpose network) at cluster 184.

Table 1 below show a non-limiting representation of parameters of configuration profile references in a template, in accordance with some embodiments.

The example profiles and parameters of table 1 are a possible representation of profiles, parameters and configuration profile references that are modified or changed by user 102. Further, the parameters inputted by user 102 are usable by data center template engine 114 to create a new template.

For example, BareMetal profile shows several possible parameters classified under a BareMetal profile type. Cluster profile shows several possible parameters classified under a cluster profile type. Application profile shows several possible parameters classified as an application profile type. Data center template profile shows several possible workflow or worker node selections.

Based upon the template selected and the parameters inputted by user 102, user interface 106 presents user 102 with a graphical user interface, such as a display screen (FIG. 2A) where user 102 inputs new parameters directed towards the BareMetal profile, cluster profile (FIG. 2B), application profile (FIG. 2C), master nodes (FIG. 2D), worker nodes (FIG. 2D), or workflow (FIG. 2D) to create a new master template.

FIG. 2A is a pictorial representation of a BareMetal profile input form 210, in accordance with embodiments of the present invention.

In some embodiments, BareMetal profile input form 210 is part of an inventory management display 241 that is part of user interface 106. User 102 is able to input a profile name at block 212, a profile category at block 214 and a profile type at block 216. Below blocks 212-216 user 101 is able to input any parameter changes to a BareMetal profile in parameter boxes 218A-C.

For example, at box 218D, input form 210 is requesting a parameter (7) for hostdomain (as shown in BareMetal profile). User 102 is able to input this parameter at box 218A. Further, at box 218E input form 210 is requesting a parameter (8) for searchdomain (as shown in BareMetal profile). User 102 is able to input this parameter at box 218B. Further, at box 218F input for 210 is requesting a parameter (9) for ver (e.g., verification) (as shown in BareMetal profile). User 102 is able to input this parameter at box 218C. In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to click on the submit button when completed to save the BareMetal profile or hit cancel to remove any changes to the parameters.

Table 1

| | Configuration Profile References | | |
|---|---|---|---|
| Bare Metal profile | Cluster profile | Application profile | Data Center Template |
| Hostname Rule | Install_type | Os_repo_url | Reference to BareMetal profile |
| Ssh user name | Cluster type | BMaaS_artifactory_url | Reference to cluster profile |
| Ssh password | Vrid rule | Kickstart_url | Reference to application profile |
| Bmc user name | Build_url | Rcp_ver | Selection of Master nodes |
| Bmc password | Ha_primary_install_args | Flavor | Selection of Worker nodes |
| Hostdomain | Ha_secondary_install_args | Workload | Selection of workflow to run |
| Search domain | Calico_ip_pool | | |
| Management ip | Dns | | |
| Service ip | Ntp | | |
| VER | Vip | | |
| | Rcp_config_version | | |
| | Version | | |

FIG. 2B is a pictorial representation of a cluster profile input form 220, in accordance with embodiments of the present invention.

In some embodiments, cluster profile input form 220 is part of an inventory management display 241 that is shown on user interface 106. User 102 is able to input a cluster profile name at block 222, a profile category at block 224 and a profile type at block 226. Below blocks 222-226 user 101 is able to input any cluster parameter changes to a cluster profile in parameter boxes 228A-C.

For example, at box 228D, input form 220 is requesting a parameter (6) for VRID rule (as shown in cluster profile). User 102 is able to input this parameter at box 228A. Further, at box 228E input form 220 is requesting a parameter (7) for install type (as shown in cluster profile). User 102 is able to input this parameter at box 228B. Further, at box 228F input form 220 is requesting a parameter (8) for version (as shown in cluster profile). User 102 is able to input this parameter at box 228C. In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to click on the submit button when completed to save the cluster profile or hit cancel to remove any changes to the parameters.

FIG. 2C is a pictorial representation of an application profile input form 230, in accordance with embodiments of the present invention.

In some embodiments, application profile input form 230 is part of an inventory management display 241 that is shown on user interface 106. User 102 is able to input an application name at block 232, an application profile category at block 234 and an application profile type at block 236. Below blocks 232-236 user 102 is able to input any application parameter changes to an application profile in parameter boxes 238A-C.

For example, at box 238D, input form 230 is requesting a parameter (1) for OS_REPO_URL (as shown in application profile). User 102 is able to input this parameter at box 238A. Further, at box 238E input form for 230 is requesting a parameter (2) for BMAAS_ARTIFACTORY_URL (as shown in application profile). User 101 is able to input this parameter at box 238B. Further, at box 228F input form 230 is requesting a parameter (3) for KICKSTART_URL (as shown in application profile). In some embodiments, this process is iterative until all parameter values are inputted. In some embodiments, parameters that are modified or changed. For example, user 102 has selected the same template as the last configuration and a few parameters have changed and thus user 102 need make a few changes as the template has retained all the previously inputted parameters. User 102 is able to input this parameter at box 238C. User 102 is able to click on the submit button when completed to save the cluster profile or hit cancel to remove any changes to the parameters.

In some embodiments, user 102 skips one or more of the requested parameters in each of input forms 210, 220, and 230. In some embodiments, user 102 modifies the parameters that are changing to replace the preconfigured cluster template.

Figure 2D:
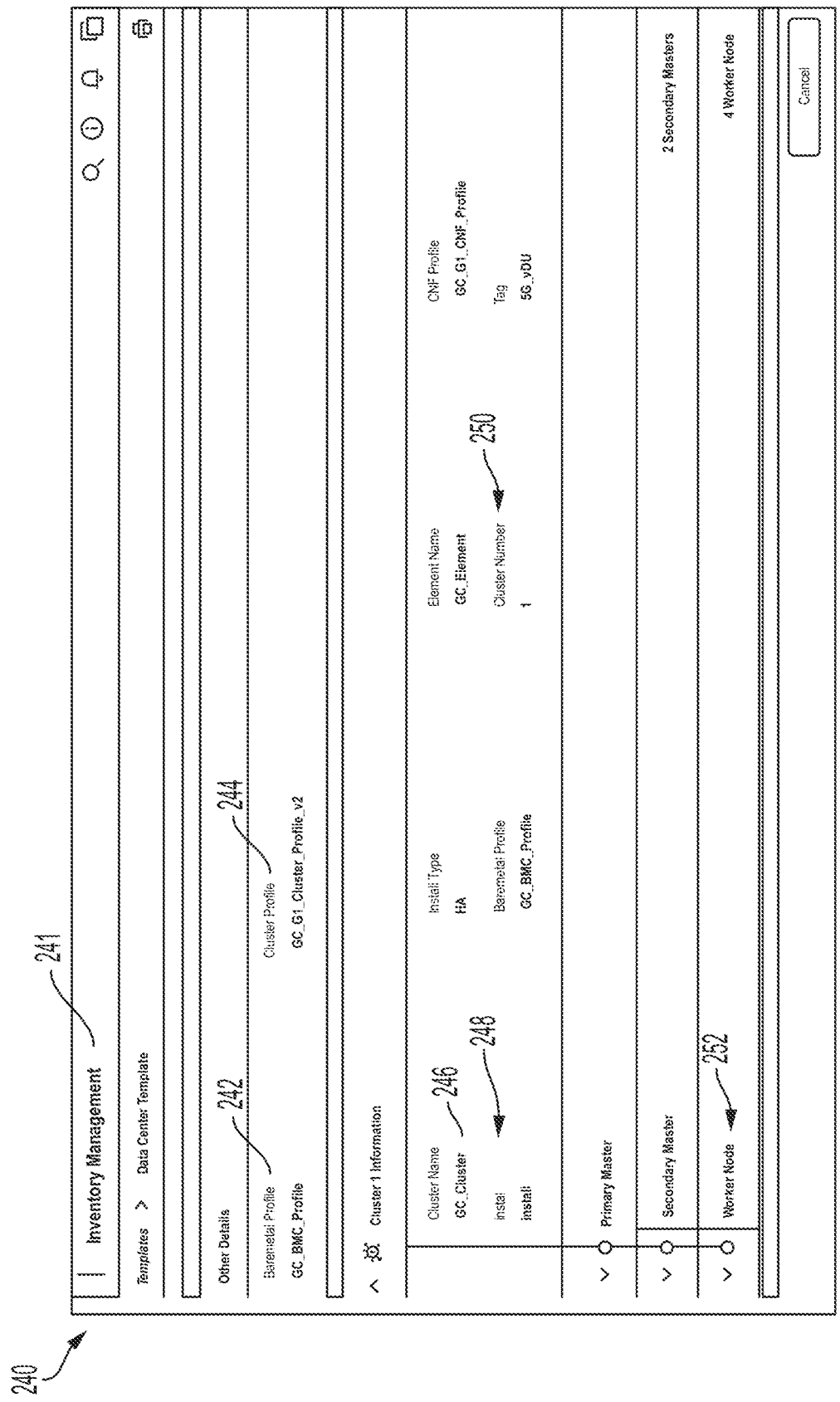
FIG. 2D is a pictorial representation of a data center template display, in accordance with embodiments of the present invention.

FIG. 2D is a pictorial representation of a data center template display 240, in accordance with embodiments of the present invention.

In some embodiments, when user 102 wants to make a change in any parameter, user 102 simply fills a profile template, such as templates 210, 220, and 230, and creates a new master template 240.

In some embodiments, master template 240 is part of an inventory management display 241 that is part of user interface 106. Based upon the inputs of user 102 master template display 240 displays a BareMetal profile 242, a cluster profile 244, cluster name 246, a workflow 248, cluster number 250 and a worker node 252. New cluster "GC_Cluster" shown at cluster name 246 is now ready to be implemented with the inputted parameters submitted by user 102.

Figure 3:
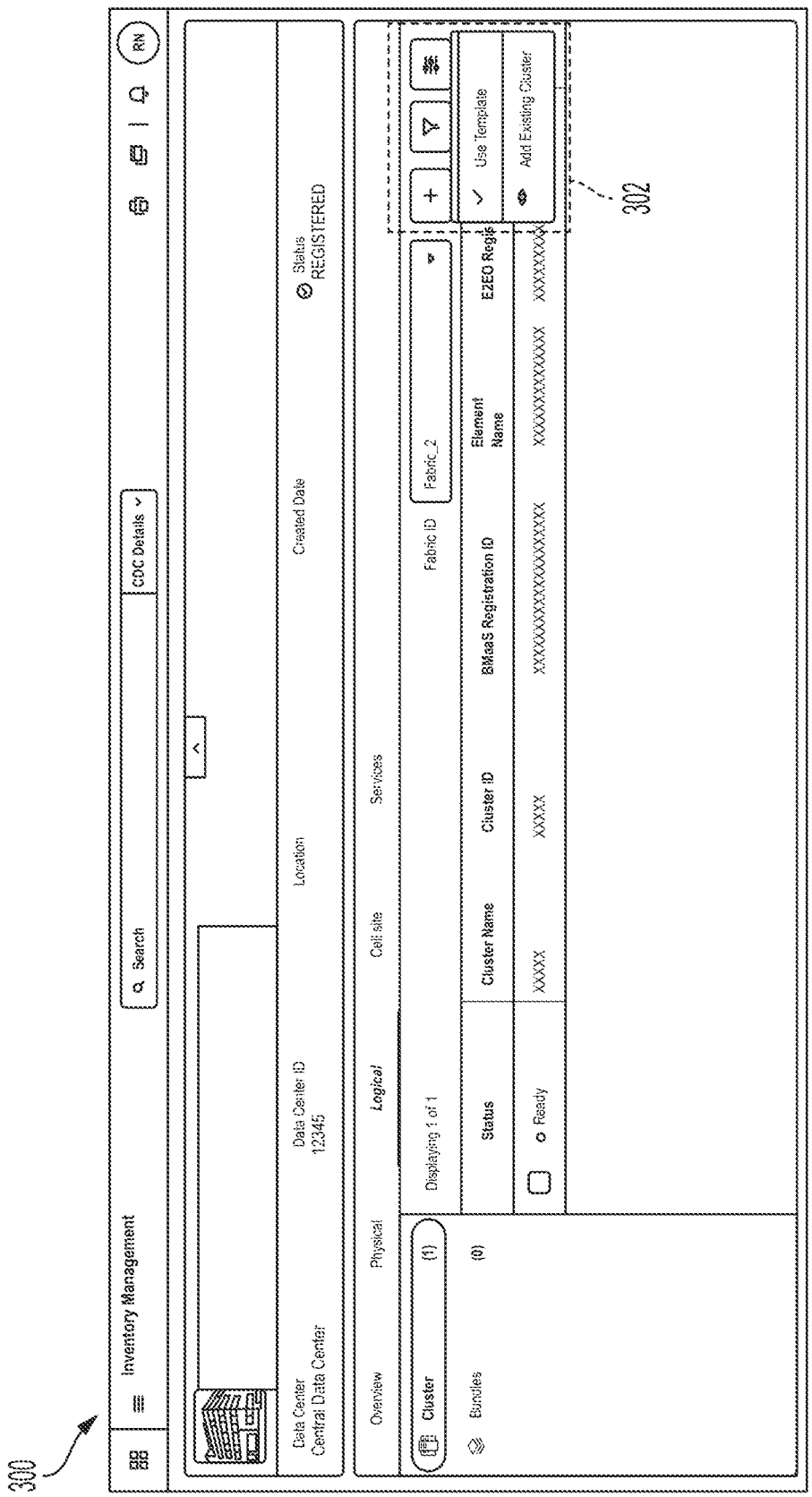
FIG. 3 is a pictorial representation of cluster template selection display, in accordance with some embodiments.

FIG. 3 is a pictorial representation of cluster template selection display 300, in accordance with some embodiments.

User 102 is able to select the newly created template in box 302 of display 300. When user 102 selects to use a new template, a confirmation screen is presented as shown in FIG. 4.

Figure 4:
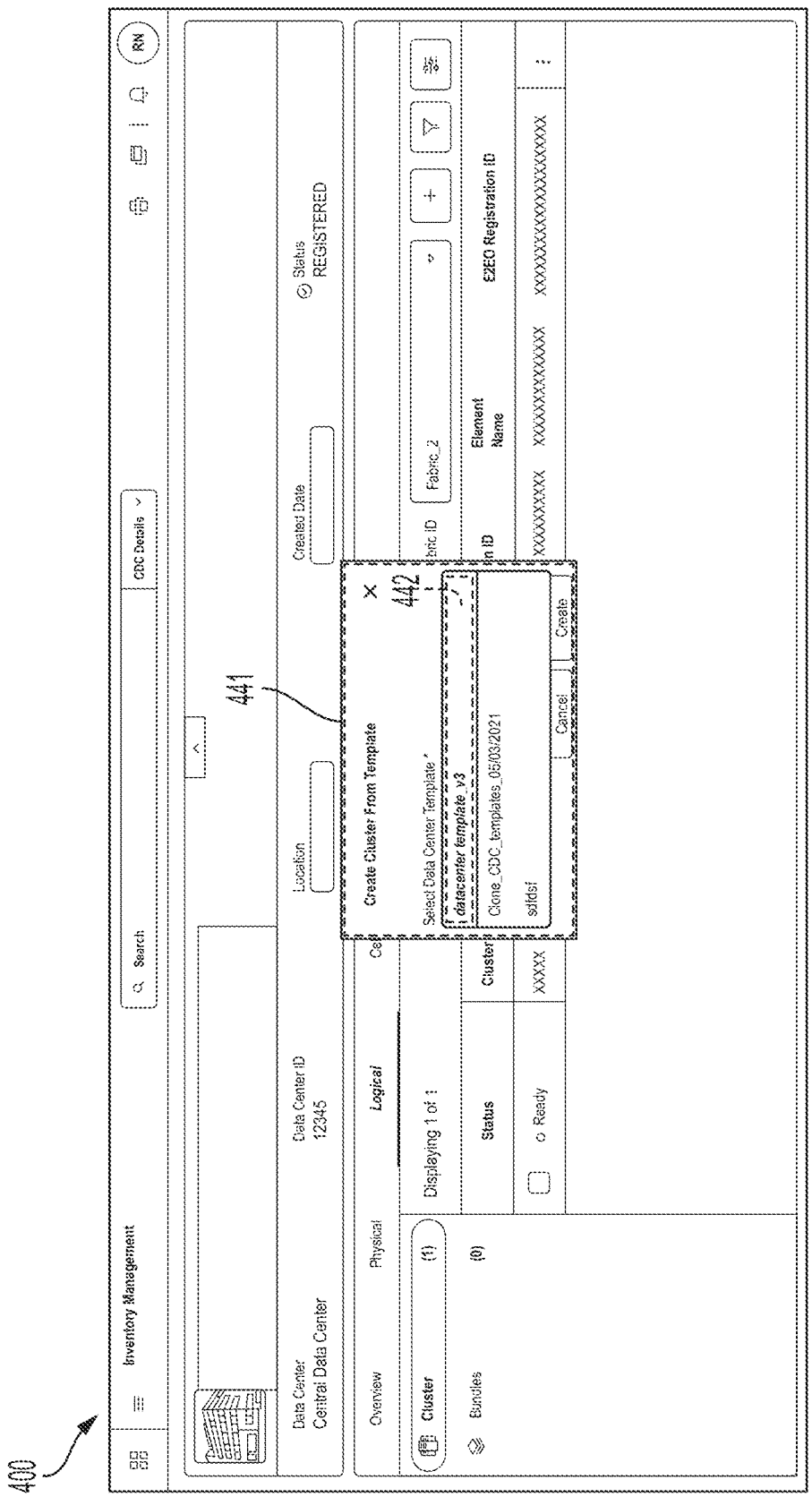
FIG. 4 is a pictorial representation of confirmation display, in accordance with some embodiments.

FIG. 4 is a pictorial representation of confirmation display 400, in accordance with some embodiments.

User 102 is able to create a cluster from template from box 441. Box 441 displays several data center templates user 102 selects from. In some embodiments, selected name 442 coincides with the newly created template name shown in display 300.

Figure 5:
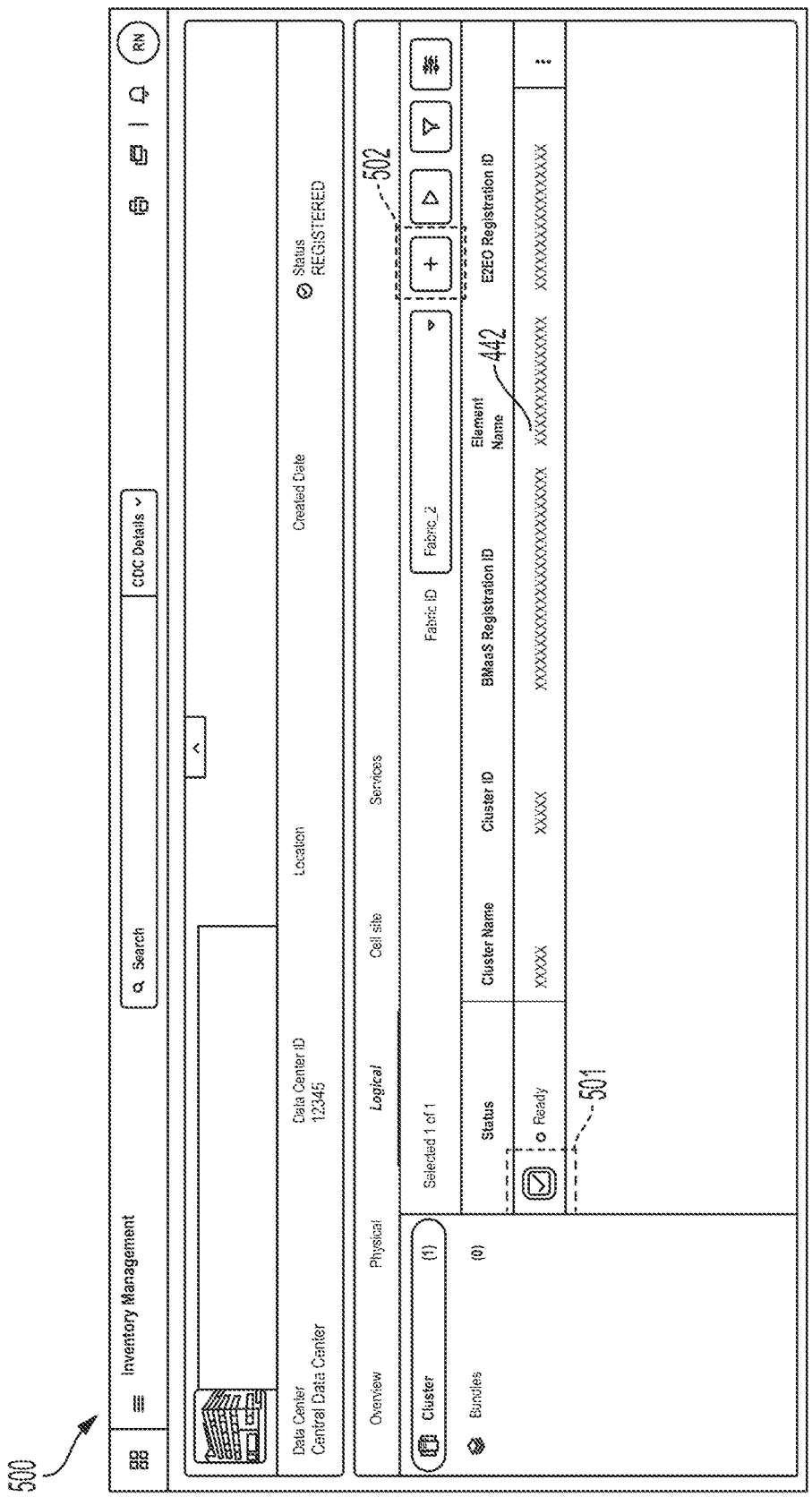
FIG. 5 is a pictorial representation of a generated planned inventory display, in accordance with some embodiments.

FIG. 5 is a pictorial representation of a generated planned inventory display 500, in accordance with some embodiments.

In some embodiments, user 102 selects the newly created template by the selected name 442, and clicking in the check box 501. User 102 then clicks on the "+" or add box 502 to generate the planned inventory file.

Figure 6:
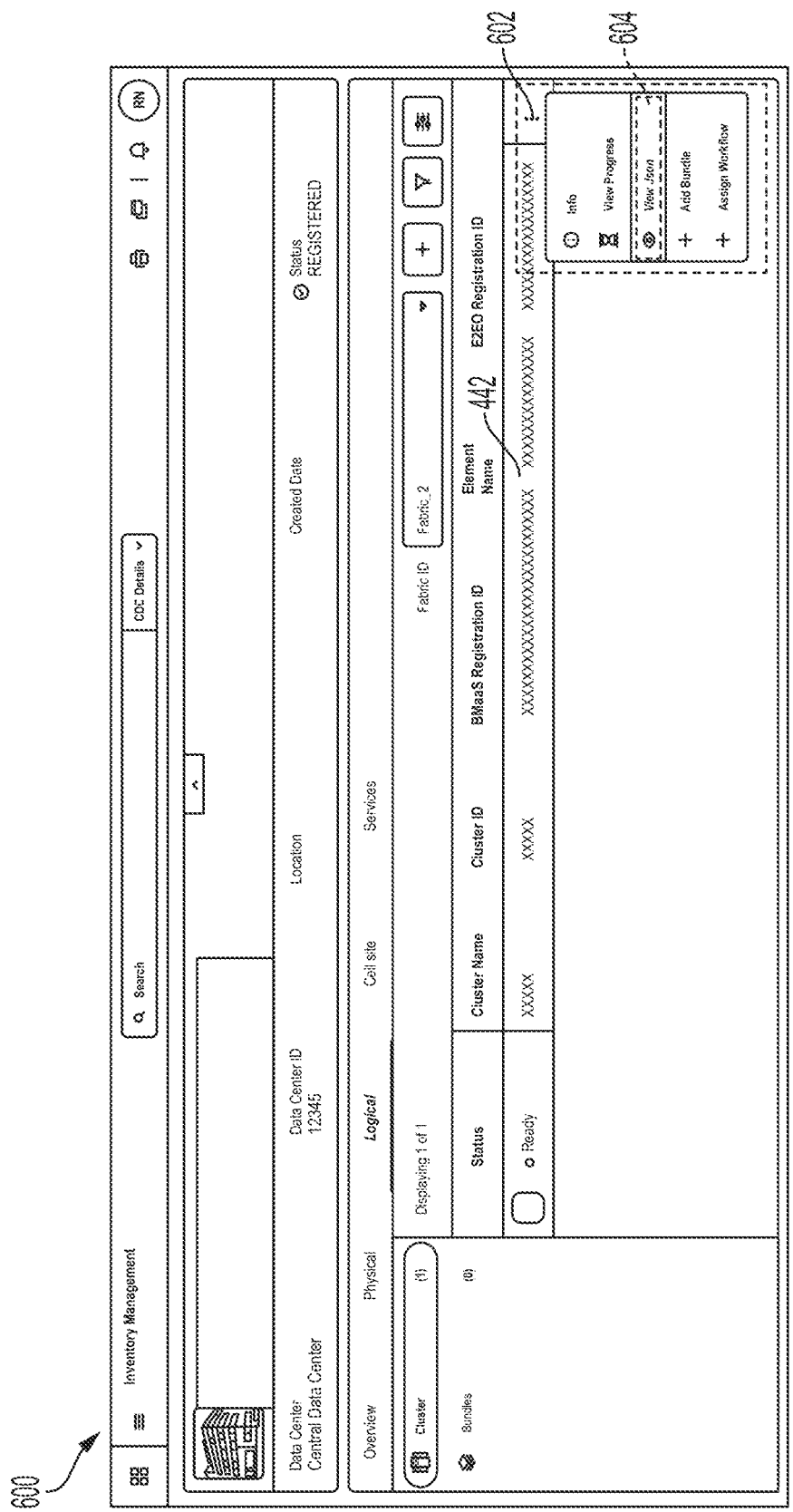
FIG. 6 is a pictorial representation of viewing source code display, in accordance with some embodiments.

FIG. 6 is a pictorial representation of viewing source code display 600, in accordance with some embodiments.

User 102 is able to verify the inventory file code has been generated. User 102 is able to click on three vertical dots 602 and box 604 opens and presents user 102 with an option to view javascript object notation (Json). User 102 then clicks on Json to be taken to a source code display (not shown).

In some embodiments, a source code display screen allows user 102 to review the Json for the inventory source code for implementing the new cluster configuration. Inventory source code is automatically generated based upon the selected template and the parameters inputted by user 102. In some embodiments, this automatic generation of code is performed by artificial intelligence, machine code learning or other suitable applications are within the scope of the disclosure.

Figure 7:
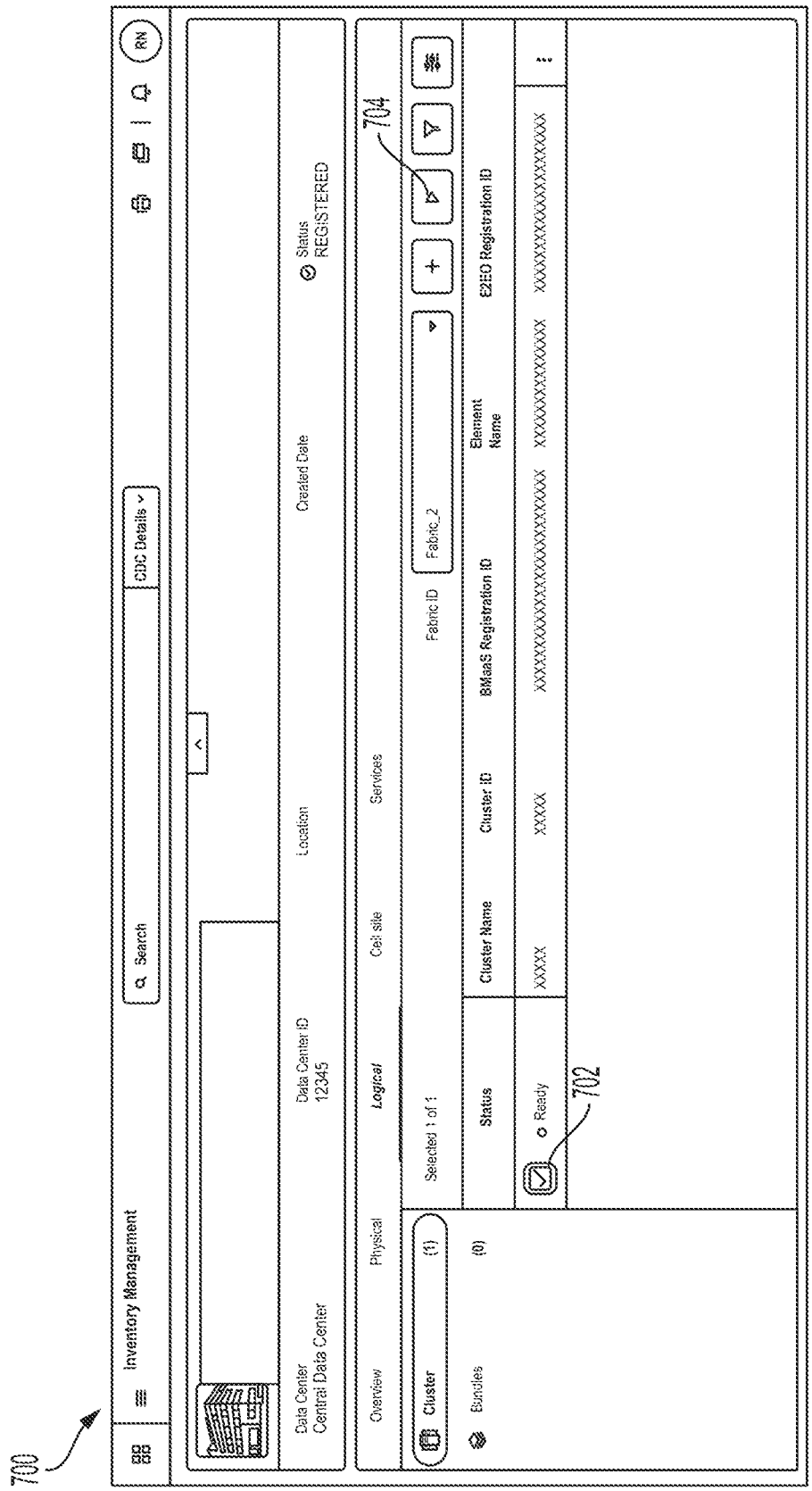
FIG. 7 is a pictorial representation of execute cluster registration display, in accordance with some embodiments.

FIG. 7 is a pictorial representation of execute cluster registration display 700, in accordance with some embodiments.

Execute cluster registration display 700 allows user 102 to select checkbox 702 and click on play button 704 to begin the cluster registration process. In some embodiments, before user 102 registers or unregisters a node in a cluster, user 102 considers are products being activated on a primary master server before user 102 activates the product on any other nodes. In some embodiments, a node cannot be registered with a cluster if the node is already a member of another cluster. In this situation, the node is first unregistered from its current cluster. In some embodiments, node registration occurs directly through the local management interface of the appliance that you want to join the cluster. In some embodiments, the appliance that you are registering is able to communicate with the primary master.

Figure 8:
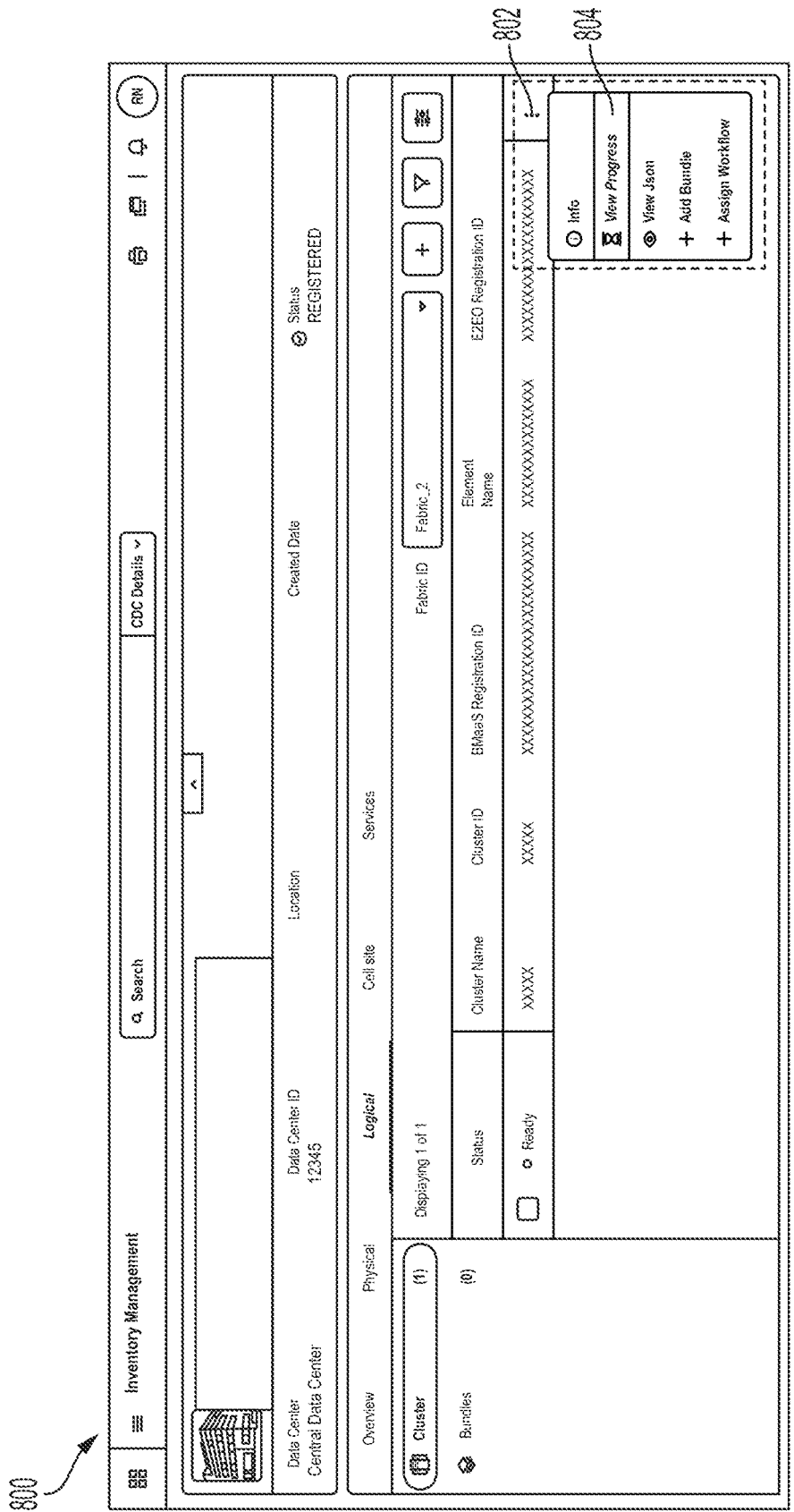
FIG. 8 is a pictorial representation of cluster registration progress display, in accordance with some embodiments.

FIG. 8 is a pictorial representation of cluster registration progress display 900, in accordance with some embodiments.

User 102 is able to track the progress of the cluster registration by clicking on vertical three-line button 802 and clicking on view progress 804.

Figure 9:
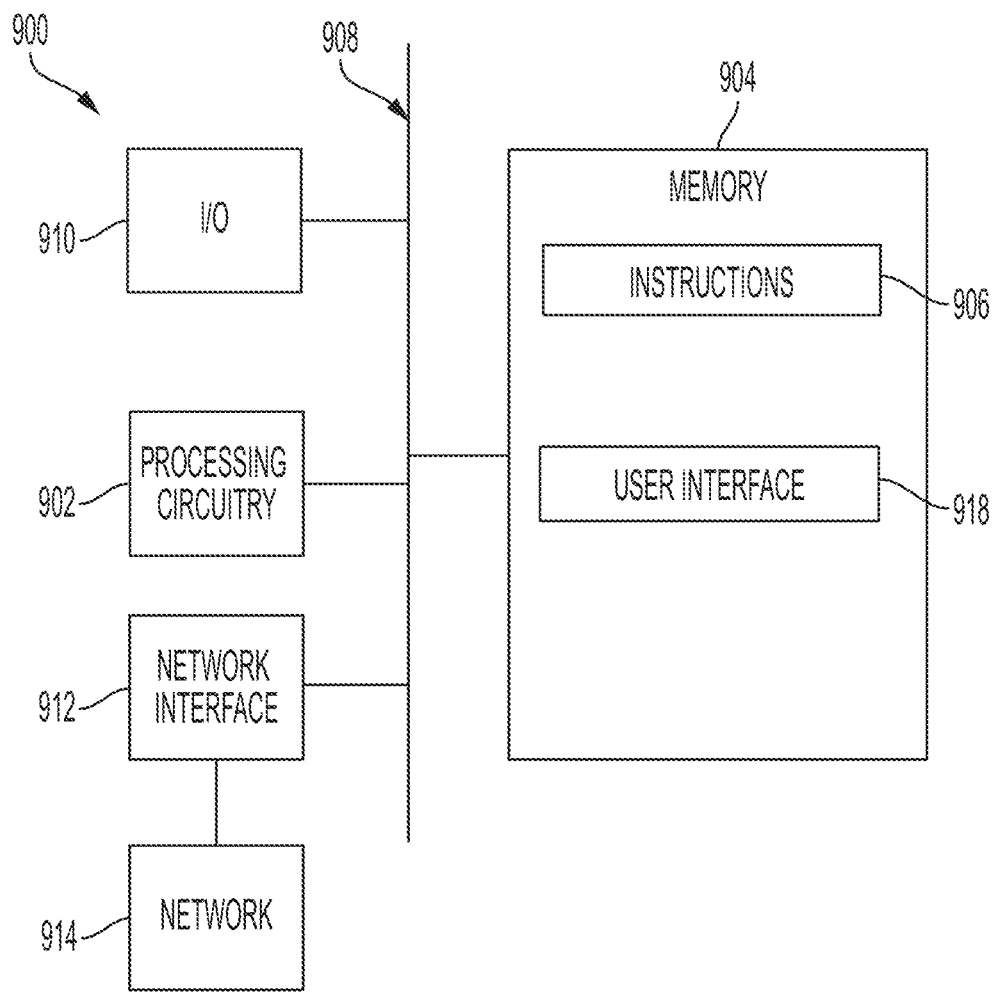
FIG. 9 is a high-level functional block diagram of a server-cluster creation processor-based system, in accordance with some embodiments.

FIG. 9 is a block diagram of server-cluster reconfiguring processing circuitry 900 in accordance with some embodiments. In some embodiments, server cluster reconfiguring processing circuitry 900 is a general purpose computing device including a hardware processor 902 and a non-transitory, computer-readable storage medium 904. Storage medium 904, amongst other things, is encoded with, i.e., stores, computer program code 906, i.e., a set of executable instructions such as data center template engine 114. Execution of instructions 906 by hardware processor 902 represents (at least in part) a server-cluster reconfiguring tool which implements a portion or all of the methods described herein in accordance with one or more embodiments (hereinafter, the noted processes and/or methods).

Processor 902 is electrically coupled to a computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause server cluster reconfiguring processing circuitry 900 to be usable for performing a portion or all of the noted processes and/or methods, such as method 150, of FIG. 1B. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-memory (ROM), a rigid magnetic disk, and/or an optical disk. In one or more embodiments using optical disks, computer-readable storage medium 904 includes a compact disk-read memory (CD-ROM), a compact disk-read/write (CD-R/W), and/or a digital video disc (DVD).

In one or more embodiments, storage medium 904 stores computer program code 906 configured to cause server cluster reconfiguring processing circuitry 900 to be usable for performing a portion or all of the noted processes and/or methods. In one or more embodiments, storage medium 904 also stores information, such as dynamic power transmission algorithm which facilitates performing a portion or all of the noted processes and/or methods.

Server cluster reconfiguring processing circuitry 900 includes I/O interface 910, that is like user interface 106. I/O interface 910 is coupled to external circuitry. In one or more embodiments, I/O interface 910 includes a keyboard, keypad, mouse, trackball, trackpad, touchscreen, cursor direction keys and/or other suitable I/O interfaces are within the contemplated scope of the disclosure for communicating information and commands to processor 902.

Server cluster reconfiguring processing circuitry 900 further includes network interface 912 coupled to processor 902. Network interface 912 allows server cluster reconfiguring processing circuitry 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more server cluster reconfiguring processing circuitry 900.

Server cluster reconfiguring processing circuitry 900 is configured to receive information through I/O interface 910. The information received through I/O interface 910 includes one or more of instructions, data, and/or other parameters for processing by processor 902. The information is transferred to processor 902 via bus 908. Server cluster reconfiguring processing circuitry 900 is configured to receive information related to a UI through I/O interface 910. The information is stored in computer-readable medium 904 as user interface (UI) 918.

In some embodiments, a method includes automatically configuring a cluster using pre-defined templates of one or more servers positioned in an edge location. The method also includes creating a plurality of configuration profile templates. The method also includes obtaining one or more parameter values. The method also includes defining a plurality of parameters in each of the plurality of configuration profile templates based upon the one or more parameter values obtained. The method also includes creating a master template based on the plurality of configuration profile templates. The method also includes storing the master template in a repository. The method also includes automatically creating a planned inventory file based on the master template. The method also includes configuring the cluster of the one or more servers based on the planned inventory. Other embodiments of this aspect include corresponding computer systems, apparatus, and computer programs recorded on one or more computer storage devices, each configured to perform the actions of the methods.

Implementations may include one or more of the following features. The method where the creating the master template based on the plurality of the configuration profile templates, includes selecting a server type. The creating the plurality of the configuration profile templates, includes identifying within each of the plurality of configuration profile templates at least one of: cluster profile; a cloud-native function (cnf) profile; or an exokernel-based profile. The method includes obtaining a user login at an inventory user interface. The method includes obtaining a create a new cluster selection. The method includes obtaining a data-center template selection. The method includes obtaining template parameters based on the master template. Implementations of the described techniques may include hardware, a method or process, or computer software on a computer-accessible medium.

One general aspect includes a system. The system also includes a processing circuitry. The system also includes a memory connected to the processing circuitry, where the memory is configured to store executable instructions that, when executed by the processing circuitry, facilitate performance of operations, includes: configuring a cluster of one or more servers positioned in an edge location using pre-defined templates; creating a plurality of configuration profile templates; obtaining one or more parameter values from a user, to define a plurality of parameters in each of the plurality of configuration profile templates; creating a master template based on the plurality of configuration profile templates that have been defined and a selection of server type; storing the master template in a repository; automatically creating a planned inventory file based on the master template; and configuring the cluster of the one or more servers based on the planned inventory file.

Implementations may include one or more of the following features. The system where the performance of operations further includes obtaining a user login to an inventory user interface. The performance of operations further includes selecting a data-center template to create a new cluster. The performance of operations further includes obtaining the parameters from the master template and related profiles. The performance of operations further includes generating unique IP address and hostname for a new template. The performance of operations further includes: filling a cluster planned inventory file; and registering the cluster planned inventory file to baremetal-as-a-service (BMaaS). The performance of operations further includes starting a cluster creation process. The performance of operations further includes parsing the planned inventory file and begin cluster creation workflow on a target cluster. Implementations of the described techniques may include hardware, a method or process, or computer software on a computer-accessible medium.

In some embodiments, a method includes configuring a cluster of one or more servers positioned in an edge location using pre-defined templates. The method also includes creating a plurality of configuration profile templates. The method also includes receiving one or more parameter values from a user, to define a plurality of parameters in each of the plurality of configuration profile templates. The method also includes creating a master template based on the plurality of configuration profile templates that have been defined and a selection of server type. The method also includes storing the master template in a repository. The method also includes creating a planned inventory file based on the master template. The method also includes configuring the cluster of the one or more servers based on the planned inventory file.

Implementations may include one or more of the following features. The method includes obtaining a user login at an inventory user interface. The method includes obtaining and storing cluster profile data. The method includes obtaining and saving baremetal profile information. The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method, comprising:
   creating a plurality of configuration profile templates for configuring one or more clusters of one or more edge servers;
   receiving a selection of at least one of the plurality of configuration profile templates;
   obtaining one or more parameter values for the selected at least one of the plurality of configuration profile templates;
   providing as input the one or more parameter values in the selected at least one of the plurality of configuration profile templates;
   creating a master template for each of the selected at least one of the plurality of configuration profile templates based on the one or more parameter values input in the selected at least one of the plurality of configuration profile templates;
   storing the master template for each of the at least one of the plurality of configuration profile templates in a repository;
   selecting at least one master template for automatically configuring the one or more clusters of one or more edge servers;
   automatically processing the selected at least one master template to automatically create source code for a planned inventory file for configuring the one or more clusters of the one or more edge servers; and
   configuring the one or more clusters of the one or more edge servers by parsing the source code for the planned inventory file automatically created based on the selected at least one master template.

2. The method of claim 1, wherein the creating the at least one master template based on the at least one of the plurality of the configuration profile templates for configuring the one or more clusters of the one or more edge servers, comprises:
   providing input of at least one of BareMetal profile data, cluster profile data, application profile data, or Data Center Template data specifying at least one worker server or master server, and selecting a server type.

3. The method of claim 1, wherein the creating the at least one of the plurality of the configuration profile templates, comprises:
   identifying within the at least one of the plurality of configuration profile templates for configuring the one or more clusters of the one or more edge servers at least one of:
   cluster profile;
   a cloud-native function (CNF) profile; or
   an exokernel-based profile.

4. The method of claim 1, further comprising:
obtaining a user login at an inventory user interface.

5. The method of claim 1,
wherein the automatically processing the selected at least one master template to automatically create the source code for the planned inventory file for configuring the one or more clusters of the one or more edge servers includes identifying required parameters, making API calls to IP address management (IPAM) for generating IP addresses, and making API calls to generate hostnames for each node of the one or more clusters of the one or more edge servers.

6. The method of claim 5, further comprising:
obtaining a data-center template selection.

7. The method of claim 1, further comprising:
obtaining template parameters based on the selected at least one master template.

8. A system, comprising:
a processing circuitry; and
a memory connected to the processing circuitry, wherein the memory is configured to store executable instructions that, when executed by the processing circuitry, facilitate performance of operations, comprising:
   creating a plurality of configuration profile templates for configuring one or more clusters of one or more edge servers;

receiving a selection of at least one of the plurality of configuration profile templates;
obtaining one or more parameter values from a user, to define the selected at least one of the plurality of configuration profile templates;
receiving as input the one or more parameter values in the selected at least one of the plurality of configuration profile templates and a selection of a server type;
creating a master template for each of the at least one of the plurality of configuration profile templates based on the one or more parameter values input in the selected at least one of the plurality of configuration profile templates and the server type;
storing the master template for each of the at least one of the plurality of configuration profile templates in a repository;
selecting at least one master template for automatically configuring the one or more clusters of one or more edge servers;
automatically processing the selected at least one master template to automatically create source code for a planned inventory file for configuring the one or more clusters of the one or more edge servers; and
configuring the one or more clusters of the one or more edge servers by parsing the source code of the planned inventory file automatically created based on the selected at least one master template.

9. The system of claim 8, wherein the performance of operations further comprises:
obtaining a user login to an inventory user interface.

10. The system of claim 8, wherein the performance of operations further comprises:
selecting a data-center template to create a new cluster.

11. The system of claim 8, wherein the processing circuitry is further configured to create the master template for each of the at least one of the plurality of configuration profile templates based on the one or more parameter values input in the selected at least one of the plurality of configuration profile templates and the server type by receiving input of at least one of BareMetal profile data, cluster profile data, application profile data, or Data Center Template data specifying at least one worker server or master server, and selection of a server type.

12. The system of claim 8, wherein the performance of operations further comprises:
generating unique IP address and hostname for a new template.

13. The system of claim 8, wherein the performance of operations further comprises:
filling a cluster planned inventory file; and
registering the cluster planned inventory file to baremetal-as-a-service (BMaaS).

14. The system of claim 8, wherein the processing circuitry is further configured to automatically process the selected at least one master template to automatically create source code for a planned inventory file for configuring the one or more clusters of the one or more edge servers by identifying required parameters, making API calls to IP address management (IPAM) for generating IP addresses, and making API calls to generate hostnames for each node of the one or more clusters of the one or more edge servers.

15. The system of claim 8, wherein the performance of operations further comprises:
beginning cluster creation workflow on a target cluster.

16. A method, comprising:
creating a plurality of configuration profile templates for configuring one or more clusters of one or more edge servers;
receiving a selection of at least one of the plurality of configuration profile templates;
receiving one or more parameter values from a user, to define the selected at least one of the plurality of configuration profile templates;
creating a master template for each of the selected at least one of the plurality of configuration profile templates based on the one or more parameter values in the selected at least one of the plurality of configuration profile templates that have been defined and a selection of server type;
storing the master template for each of the at least one of the plurality of configuration profile templates in a repository;
selecting at least one master template for automatically configuring the one or more clusters of one or more edge servers;
automatically processing the selected at least one master template to automatically create source code for a planned inventory file for configuring the one or more clusters of the one or more edge servers; and
configuring the one or more clusters of the one or more edge servers by parsing the source code for the planned inventory file automatically created based on the selected at least one master template.

17. The method of claim 16, further comprising:
obtaining a user login at an inventory user interface.

18. The method of claim 16,
wherein the creating the master template for each of the selected at least one of the plurality of configuration profile templates based on the one or more parameter values in the selected at least one of the plurality of configuration profile templates that have been defined and a selection of server type includes providing input of at least one of BareMetal profile data, cluster profile data, application profile data, or Data Center Template data specifying at least one worker server or master server.

19. The method of claim 16,
wherein the automatically processing the selected at least one master template to automatically create the source code for the planned inventory file for configuring the one or more clusters of the one or more edge servers includes identifying required parameters, making API calls to IP address management (IPAM) for generating IP addresses, and making API calls to generate hostnames for each node of the one or more clusters of the one or more edge servers.

20. The method of claim 16, further comprising:
selecting master servers and worker servers.

* * * * *